United States Patent Office 3,759,727
Patented Sept. 18, 1973

3,759,727
COATINGS
Raymond Louis Dietz, Toledo, Ohio, and Allan L. McFadden, Monroe, Conn., assignors to Owens-Illinois, Inc.
No Drawing. Filed Oct. 27, 1970, Ser. No. 84,541
Int. Cl. C03c 3/12, 3/22, 3/30
U.S. Cl. 106—49
9 Claims

ABSTRACT OF THE DISCLOSURE

Provided is an overglaze composition particularly useful for protecting a microelectronic circuit from environmental shock and contamination. Such an overglaze comprises by weight about 15–60 percent PbO, 12–40 percent $B_2O_3$, 5–45 percent ZnO and produces, upon being fired from a printed paste at a firing temperature below about 650° C., a vitreous glass coating which is substantially hermetic in its sealing characteristics. The overglaze composition may optionally accommodate up to 12 percent by weight of other various oxides such as, for example, $SiO_2$, CuO, $V_2O_5$, BaO, $Bi_2O_3$, $TiO_2$, $ZrO_2$ and/or may optionally accommodate up to 25 percent by weight of dispersed particulate ceramic materials. In addition, the coating so formed, when fired upon a ceramic substrate having a coefficient of thermal expansion of less than about $100 \times 10^{-7}$ in./in./° C., exhibits a tenacious bond and a structural stress at the bond interface of between about 2000 p.s.i. in compression to about 1200 p.s.i. in tension. Printing pastes are formed from these compositions by admixing the glass produced, in particulate form, with a conventional liquid organic vehicle in amounts sufficient to render the pastes printable.

---

This application deals with coating compositions, coatings and coated substrates produced therefrom and methods of making same. More particularly, this invention relates to overglaze compositions particularly useful for forming overglazes which protect and hermetically seal microelectronic circuits printed upon ceramic substrates. By "hermetically seal" is meant protection from contact with any substantial amount of active injurious ingredients found in the atmosphere.

The art, especially the art of microelectronic circuitry, has long known of the need to coat certain components and thereby protect them from environmental shock and contamination. For example, microelectronic circuitry printed and fired upon ceramic substrates are generally thereafter coated with an "overglazing" composition in paste form which, when fired at a given firing temperature, produces a glass fulfilling the described function.

As used herein, the term "firing temperature" means the temperature of the overglazing composition at which the viscosity of the overglazing composition is approximately $10^4$ poises.

Generally speaking, such overglazing compositions in paste form, must be capable of having a firing temperature below about 650° C. in order to prevent undue injury to the electronic components which they are to protect, as well as for general economic reasons. One of the problems which has arisen in the art is the difficulty of achieving a paste-type of overglazing composition which will fire at the requisite low firing temperatures (below 650° C. and preferably below about 600° C.), and at the same time produce an overglaze which exhibits the necessary expansion and contraction characteristics to provide a tightly bonded, strongly sealed structure. While crystallized substances and borosilicates have been developed to have the necessary expansion and contraction characteristics, their firing temperatures are often very high. Furthermore, it has been found that crystallization tends to decrease the strength of the ceramic bond and increase firing temperatures. In many of the vitreous glasses developed, the requisite firing temperatures are minimized, but adverse expansion and contraction characteristics are experienced. In some instances, the additives necessary to obtain lower firing temperatures in both the devitrified and vitreous glasses tend to be chemically reactive and thus adversely affect many of the conventional microelectronic circuits which they coat. It is therefore apparent that there exists a definite need in the art for a new glass system which may be fired in paste form at relatively low temperatures to form hermetic coatings, especially for microelectronic circuitry, which are strongly bonded and, because of their expansion and contraction characteristics, form a compatible, strong structure resistant to mechanical abrasion and thermal shock.

It is the purpose of this invention to fulfill the above need in the art by providing a unique overglazing composition which may be readily formed into a printing paste, easily printed and which possesses a firing temperature below about 650° C., usually below about 600° C. and, in a preferred form, below about 500° C. The glass coating so formed is substantially vitreous and exhibits excellent bonding strength. In addition, the expansion and contraction characteristics are such as to provide a mechanically and thermally strong coating for overglaze purposes in the microelectronic circuitry art.

Generally speaking, the overglaze compositions contemplated by this invention comprise by weight about 15–60 percent PbO, 12–40 percent $B_2O_3$ and 5–45 percent ZnO, and upon being fired when in printed paste form at a temperature below about 650° C. produce substantially vitreous glass structures which are substantially impervious to injurious atmospheric contamination. Additionally, the overglaze compositions of this invention are capable of forming a strong adherent bond with a ceramic substrate and, upon being fired on said substrate, exhibit stresses at the bond interface in the coating in the range of from about 2000 p.s.i. compression to 1200 p.s.i. tension. Preferably, the coatings, when used in microelectronic circuitry as overglazes, are in a thickness of about 0.5–2.0 mils and have interfacial bond stresses in the range of from about 1000 p.s.i. tension to 1500 p.s.i. compression. Most preferably, the stresses are in compression and are in the order of about 200–1200 p.s.i.

It has been found, especially when working with overglazes in the microelectronic circuitry art, that the above described interfacial stresses are those necessary to maintain the integrity of the system. That is to say, if upon cooling from firing there occurs at the bond interface, stresses outside of the above ranges, the coating will tend to be weakened to the point where it cannot withstand the necessary thermal and mechanical shock to which it is subjected during use in order to maintain its protective hermetically sealing qualities. While some tension stresses may be tolerated, as described, it is preferred to use glass compositions which, upon being cooled from firing, set up in compression. Such compression tends to strengthen the system as a whole and maximize protection from mechanical shock. However, if too high a compression stress is achieved, the strain upon the interfacial bond actually serves to weaken the structure while the effect upon the component hermetically sealed within is adverse. For example, in those instances where microelectronic circuits are coated, too high a compression may actually change their electrical properties.

All of the glasses contemplated for use in this invention generally are fireable, from their paste form, at temperatures less than about 650° C. However, in many preferred instances, they are fireable below about 600° C. and in certain preferred instances are fireable from their paste form at temperatures less than about 500° C. (i.e. about 500° C. or below). Not only do such low firing temperatures optimize the economic features of processing and producing the coatings of this invention, but when such coatings are used as overglazes in microelectronic circuitry, they also insure that minimal damage will be effected to the electronic components which they seal.

Although the above-described compositions may be formulated within the above given range of ingredients, it is more preferred, especially when using the coating compositions of this invention as overglazes for hermetically coating microelectronic circuitry, to use a composition comprising by weight about 50–58 percent PbO, about 20–25 percent $B_2O_3$, and about 18–25 percent ZnO. A specific embodiment, particularly preferred for the purposes of this invention, for coating microelectronic circuitry within the preferred range is a glass composition comprising by weight about 57 percent PbO, about 22 percent $B_2O_3$, and about 21 percent ZnO.

The glass overglaze compositions contemplated by this invention may consist of a three component system of PbO, $B_2O_3$, and ZnO or they may contain four, five, or more components. That is to say, this invention contemplates the consistent use of a PbO, $B_2O_3$ and ZnO system within the above-described ranges which may also include other oxides which become a part of the glass structure as well. Such other oxides may be added in order to help adjust the ultimate stress achieved, lower or raise the firing temperatures, and the like for a given system and environment. Oxides of this type are well-known in the art, examples of which include $SiO_2$, CuO, $V_2O_5$, BaO, $Bi_2O_3$, $TiO_2$, and $ZrO_2$.

The alkali metal oxides such as $Na_2O$, $K_2O$, etc., are known for their effect upon lowering the firing temperature and thus might possibly be used in some instances contemplated herein. Generally speaking, however, the glass compositions of this invention exclude the alkali metal oxides because such oxides are reactive with fired microelectronic circuitry and thus should be avoided.

The described optional oxides of the systems of this invention are usually employed, if at all, in amounts by weight not exceeding 12 percent of the total glass composition, preferably not exceeding 7 percent, and in particularly preferred embodiment are not used at all. When the oxides are used, a particularly preferred oxide for the purposes of this invention is silicon dioxide which generally has the effect of increasing the compression stress and thus the strength of the coating.

This invention also contemplates the addition to the overglaze system of particulate adjuster materials such as particulate ceramics of conventional types. While the oxide additives described hereinabove actually become a part of the glass, the ceramic adjusters are added in particulate form and remain in substantially particulate form throughout the treatment and formation of the overglaze. That is to say, while a small amount of the ceramic material may dissolve upon firing into the glass, generally speaking, the major portion of the ceramic material added remains as dispersed discrete particles within the continuous amorphous glass phase.

The exact function of these adjusters is not known. However, it is believed that these materials, in finely divided particulate form dispersed in the continuous vitreous phase, serve to interrupt microcrack rupture to some extent at the bond interface, but mainly, elsewhere in the overglaze system. Thus, it is believed that the use of adjusters supplements the stress at the bond interface to add strength to the system, and also serves to strengthen the other portions of the overglaze.

Generally speaking, any of the well-known ceramics may be used as adjusters for the purposes of this invention. However, the amount of ceramic added to any given system is usually limited in its upper amount by the fact that these ceramics generally raise the firing temperature of the system. Thus, for any given system, ceramic materials should not be added in an amount greater than that which would raise the firing temperature of the overglaze system above about 650° C. At the same time, the upper limit of the amount of ceramic, though usually reached by the characteristic of firing temperature of the system, may, in some instances, be reached prior to this time by the addition of too much ceramic such that undue porosity exists in the system for lack of glassy binders. For most systems contemplated by this invention, the particulate ceramic material should not exceed about 25 percent by weight of the total glass system, preferably not exceeding 10 percent by weight, and in one preferred embodiment, is about 5 percent by weight of the glass system. By "glass system" is meant the total of the glass binder and the adjuster ceramic. In a preferred system, the ceramic material is zircon in an amount of from about 5 to 25 percent by weight.

Examples of ceramics which may be adjusters include the various zirconium silicates such as $ZrSiO_4$, $BaZrSiO_4$, $MgZrSiO_4$ and $ZnZrSiO_4$ as well as such oxides as $SiO_2$, $Al_2O_3$, $TiO_2$, and crystallized glass particles generally of the lithia-alumina-silica type. Mixtures of these ceramics may also be employed. Usually all are employed in particle sizes averaging less than about 5.0 microns and preferably less than 1.0 micron. For the purposes of this invention, zircon ($ZrSiO_4$) is preferred.

The substrates contemplated for bonding the above unique overglazing composition thereto may be any of the well-known ceramic substrates conventional in the art. For best results, it is preferred to use ceramic substrates having a coefficient of thermal expansion of less than about $100 \times 10^{-7}$ in./in./° C. As hereinabove described, this invention finds particularly high utility in the microelectronic circuitry art wherein electronic circuits such as conductors, resistors, dielectrics, capacitors, and the like are bonded to a substrate in a printed predesigned used in the microelectronic circuitry art are the aluminas, the beryllias, the hafnias, cordierite ([Mg, Fe]$Al_4Si_5O_{18}$), steatite (hydrous $MgSiO_4$), olivine $(MgFe)_2SiO_4$ and mullite ($3Al_2O_3.2SiO_2$). The accepted coefficient of thermal expansion (0–300° C.) for these conventional substrates are listed in the following table.

TABLE A

| Ceramic substrate: | $\alpha^* (\times 10^7$ in./in./° C.) |
|---|---|
| Aluminas | 65–85 |
| Beryllias | About 95 |
| Hafnia | About 97 |
| Cordierite | About 30 |
| Steatites | 77–82 |
| Forsterite | About 99 |
| Mullite | About 42 |

*At least from 0–300° C.

A particularly preferred substrate contemplated for use in the environment of this invention is an alumina substrate comprised of 96 percent $Al_2O_3$ which is a conventional substrate used in the microelectronic circuitry art and which has a coefficient of thermal expansion of about $79 \times 10^{-7}$ in./in./° C. A particularly preferred glass composition found to be exceptionally useful with this preferred substrate comprises by weight about 57 percent PbO, about 22 percent $B_2O_3$, and about 21 percent ZnO, which makes up the glassy phase. Dispersed in this glassy phase is zircon ($ZrSiO_4$) having an average particle size of less than about 0.5 micron. In this preferred composition, the glassy phase constitutes 95 percent by weight of the total system while the milled zircon constitutes about 5 percent by weight of the total composition.

The above-described overglaze compositions contemplated by this invention are particularly unique in that they may be formulated into a printing paste, printed upon a substrate and/or components to be sealed and protected, thereafter fired at a temperature below about 650° C., preferably below about 600° C., and in some instances below about 500° C.

Pastes contemplated by this invention are formulated by admixing an amount of particulated glass composition with the requisite amount of a conventional organic liquid vehicle which will dissipate during an initial drying stage and the early stages of the firing process and preferably at a temperature not higher than about 325° C. Generally speaking, all of the particles have a micron size of about −400 mesh or lower, and, in the instance where a ceramic adjusted is added to the system, the glass binder may have a particle size of less than about −400 mesh while the ceramic, as stated, actually has a particle size of less than about 5 microns and preferably less than about 1 micron.

Any of the conventional organic vehicles well-known in the printing art may be used in the practice of this invention. A particularly preferred vehicle for the purposes of this invention includes a mixture of butyl Carbitol acetate (trademark of Union Carbide Corp. for diethylene glycol, monobutyl ether acetate) and iso-amyl salicylate preferably in a ratio by weight of 2:1, preferably with a thickener such as ethyl cellulose. An especially preferred organic vehicle for the purposes of this invention consists of 95 percent by weight of a 2:1 weight ratio of butyl Carbitol acetate and iso-amyl salicylate and 5 percent by weight of ethyl cellulose (e.g. N–200).

As stated hereinabove, while the pastes contemplated by this invention may be used to coat substrates generally, in a particularly preferred use of the paste of the invention, the coating compositions are used as overglazes to protect a microelectronic circuit which has previously been coated and then fired upon a ceramic substrate. Generally speaking, this is accomplished by a conventional printing technique which usually consists of using a standard screen technique for printing a microelectronic circuit in a predesigned pattern upon a ceramic substrate and firing same in a known manner to produce a final circuit bonded to the substrate. Thereafter, the overglaze pastes of this invention are printed upon and over a preselected area generally encompassing the entire microelectronic circuit to be protected and a portion of the further extending substrate to which the overglaze is bonded. Generally speaking, a sufficient number of layers (i.e. one or more) of the overglaze are printed so as to provide a final overglaze coated thickness of about 0.5–2.0 mils.

After the overglaze paste is printed in its desired pattern, it is oven-dried at about 125° C. for a period of about 5–25 minutes and then fired in a conventional firing furnace at the requisite firing temperature, below about 650° C. for a period of about 4–10 minutes at peak with 8–15 minutes heat-up and cool-down periods.

The resulting final overglaze composition is found to be smooth, hermetically tight, strongly bonded to the alumina substrate, and, by the choice of the requisite amount of each ingredient in the system, is found to provide a total structure which is strongly resistant to both mechanical and thermal shock.

The following examples are presented by way of illustrating further the invention hereinabove described.

EXAMPLES 1–5

The following overglaze compositions have been found to be useful for forming overglazes in microelectronic circuitry on alumina or other substrates. When formed into overglazes, in accordance with the printing paste technique hereinbefore described, and fired at the indicated firing temperature upon a 96 percent alumina substrate having a coefficient of thermal expansion of $79 \times 10^{-7}$ in./in./° C., the compositions of Examples 1–5 are substantially transparent and vitreous in that substantially no crystallization occurs during the firing process.

TABLE B

| Example | 1 | 2 | 3 | 4 | 5 |
|---|---|---|---|---|---|
| PbO | 30 | 57 | 50 | 40 | 20 |
| B₂O₃ | 30 | 22 | 30 | 20 | 30 |
| ZnO | 40 | 21 | 10 | 30 | 40 |
| SiO₂ | | | 10 | 10 | 10 |
| α¹ | 49 | 70.5 | 60.8 | 55.0 | 47.3 |
| Minimum firing temperature, ° C. | 585 | 488 | 522 | 558 | 600 |

¹ Coefficient thermal expansion×10⁷ in./in./° C.

EXAMPLES 6–11

The glasses of Examples 1–5 were formulated in accordance with conventional techniques. Each glass was fritted and ground to an average particle size of about −400 mesh. Thereafter, some of the fritted glasses were admixed with various amounts of zircon having an average particle size of about 0.2 micron. In the following table, the percent by weight zircon of the total glass plus zircon is indicated, the remainder being the glass frit. The so mixed glass and zircon were added to an organic vehicle consisting of 5 percent by weight ethyl cellulose (N–200) and 95 percent by weight of a 2:1 weight ratio admixture of butyl Carbitol acetate and iso-amyl salicylate such that the vehicle constituted 25 percent by weight of the paste while the remainder (75 percent by weight) was solid particulate glass plus zircon. The paste so formulated was then printed using a screen printer 200 mesh screen onto a 96 percent alumina substrate having a coefficient of thermal expansion of about $79 \times 10^{-7}$ in./in./° C. The substrate had previously been provided with a microcircuit capacitor consisting of a PdAu bottom and top conductor with a capacitor dielectric material of about 1.5 mils in thickness located therebetween. The paste was printed in a one-coat operation and fired at 500° C. for a 5 minute peak with a 12 minute heat-up and cool-down period. The resulting thickness of the overglaze glass so formed was about 0.5–1 mil. The results including the stress in the overglazes formed are reported in the following table:

TABLE C

| Ex. | Glass comp. | Stress (p.s.i.)¹ | Percent zircon | Characteristics of overglaze |
|---|---|---|---|---|
| 6 | Ex. 2 | >1,200 ten | 0 | Clear, smooth, vitreous hermetical seal, failed thermal shock test.² |
| 7 | Ex. 2 | 400 ten | 25 | Rough, non-hermetic seal, passed thermal shock test. |
| 8 | Ex. 2 | 480 ten | 12.5 | Semi-smooth, non-hermetic seal, passed thermal shock test. |
| 9 | Ex. 2 | 350 ten | 6.25 | Smooth vitreous hermetic seal, strong bond, passed thermal shock test. |
| 10 | Ex. 2 | 550 ten | 3.125 | Clear, smooth vitreous hermetic seal, failed thermal shock test. |
| 11 | Ex. 2 | 800 ten | 5.0 | Excellent, clear, smooth vitreous seal, strong bond, passed thermal shock test. |
| 12 | Ex. 3 | 440 ten | 0 | |
| 13 | Ex. 4 | 380 ten | 0 | |
| 14 | Ex. 5 | 480 comp | 0 | |
| 15 | Ex. 1 | Cracked | 0 | |

¹ The stress actually occurring is not reported. Rather, for convenience, and in accordance with conventional practice, the stress in the glaze is approximated by coating a paste bead of the composition onto the end of a glass rod which has a coefficient of thermal expansion closely approximating the alumina substrate. In this instance, an alumina borosilicate glass rod having a coefficient of thermal expansion of about $79 \times 10^{-7}$ in./in./° C. (0–300° C.) was employed. In actual matching tests, such a rod when sealed to the alumina substrate formed in tension of 160–220 p.s.i. which is considered an acceptable match. The bead upon the glass rod was fired at a temperature of either 550° C. (Ex. 6–12) or 625° C. (Ex. 13–15) using a 35° C./min. heat-up time, a 10 min. peak residence time and a 35° C./min. cool-down time. The thicknesses of the resulting beads were approximately and respectively 6, 4, 2, 2, 2, 4, 5, 4, 3, 2 mils. The stress was measured by using a conventional polarimeter. In order to use the polarimeter, the substrate must, of course, be substantially transparent. This is the reason why the glass rod approximation test is conventionally used since the alumina substrate is opaque.

² Thermal shock test: dip component and overglaze into −65° C. bath and then heat to 150° C.; repeat 4 more times and observe. If cracks occur, test is designated as a failure.

Of the above examples, only Examples 9 and 11 formed excellent overglazes in that they were substantially hermetic, provided sufficient bonding and strength characteristics, and passed the thermal shock test. The firing temperature used was 500° C., which is very low, relatively speaking, in the art. Examples 7 and 8 may be rendered acceptable as overglazes by raising the firing temperature to about 600° C. and 575° C. respectively, thereby to render the coating smooth and hermetic. While Example 10 did not withstand the thermal shock test when coated on alumina, this is not to say that this composition is not useful under less rigorous conditions if matched with other substrates having different coefficients of thermal expansion within the hereinbefore described range. Example 6 illustrates the preferred composition without an additive oxide or adjuster. The composition formed a coating but because it exceeded the 1200 p.s.i. tension limit it was not well-bonded. Such an example does not, however, negate the usefulness of such a composition with other substrates and/or under less rigorous conditions. Quite to the contrary, its low minimum firing temperature makes it potentially extremely useful in areas where high temperatures cannot be tolerated.

Once given the above disclosure, many other features, modifications and improvements of this invention become apparent to the skilled artisan. Such other features, modifications and improvements are considered, therefore, to be part of this invention, the scope of which is to be determined by the following claims:

We claim:
1. A coating composition consisting essentially of about

| | Weight percent |
|---|---|
| PbO | 50–58 |
| $B_2O_3$ | 20–25 |
| ZnO | 18–25 | and about 5–25 percent by weight of particles, said zircon having an average particle size of less than about 5 microns, which composition when fired at a temperature below about 600° C. will produce a substantially vitreous glass structure which is substantially impervious to atmospheric contamination, is capable of forming a strong adherent bond with a ceramic substrate selected from aluminas having a coefficient of thermal expansion of about $65–85 \times 10^{-7}$ in./in. ° C., and which exhibits when so fired upon said substrate, a structural stress at the bond interface of between about 2000 p.s.i. in compression to about 1200 p.s.i. in tension.

2. A coating composition in accordance with claim 1, including up to 7 percent by weight of another oxide material selected from the group consisting of CuO, $V_2O_5$, BaO, $Bi_2O_3$, $TiO_2$ and $ZrO_2$ and mixtures thereof.

3. A coating composition in accordance with claim 1 in which the structural stress is about 1500 p.s.i. in compression to about 1000 p.s.i. in tension.

4. A coating composition in accordance with claim 1 in which the structural stress is about 200 p.s.i. to about 1200 p.s.i. in compression.

5. A coating composition in accordance with claim 1 in which the average particle size of the zircon is less than about 1 micron.

6. A coating composition in accordance with claim 1 in which the said composition consists essentially of about 57 percent by weight PbO, about 22 percent by weight $B_2O_3$ and about 21 percent by weight ZnO.

7. A coating composition in accordance with claim 6 in which the ceramic substrate is about 96% $Al_2O_3$ and has a thermal coefficient of expansion of about $79 \times 10^{-7}$ in./in./° C.

8. A coating composition in accordance with claim 7 in which the zircon has an average particle size of less than about 0.5 micron.

9. A coating composition in accordance with claim 8 which is capable of being fired at a temperature below about 500° C. to produce said structure.

References Cited

UNITED STATES PATENTS

| 1,708,843 | 4/1929 | Skaupy et al. | 106—49 |
| 2,282,540 | 5/1942 | Deyrup | 106—49 |
| 2,425,032 | 8/1947 | Deyrup | 106—49 |
| 2,468,868 | 5/1949 | Danzin et al. | 106—53 |
| 3,061,664 | 10/1962 | Kegg | 106—49 |
| 3,258,350 | 6/1966 | Martin et al. | 106—47 R |
| 3,533,861 | 10/1970 | Foster et al. | 106—53 |

FOREIGN PATENTS

| 1,302,195 | 7/1962 | France | 106—39.6 |

HELEN M. McCARTHY, Primary Examiner
M. L. BELL, Assistant Examiner

U.S. Cl. X.R.

106—47 R, 53; 117—125

UNITED STATES PATENT AND TRADEMARK OFFICE
CERTIFICATE OF CORRECTION

PATENT NO. : 3,759,727
DATED : Sept. 18, 1973
INVENTOR(S) : R.L.Dietz and A.L.McFadden It is certified that error appears in the above–identified patent and that said Letters Patent are hereby corrected as shown below:

Col. 4, line 41, after "predesigned" insert --pattern. Examples of the ceramic substrates conventionally--.
Col. 5, line 14, change "adjusted" to --adjuster--.
Col. 7, line 33, after "of" insert --zircon--. Col. 8, line 30, under References Cited, "1,708,843" should be --1,708,743--.

Signed and Sealed this

Twenty-second Day of March 1977

[SEAL]

Attest:

RUTH C. MASON
Attesting Officer

C. MARSHALL DANN
Commissioner of Patents and Trademarks